US012688534B2

(12) United States Patent
Geiger

(10) Patent No.: US 12,688,534 B2
(45) Date of Patent: Jul. 21, 2026

(54) SYSTEM FOR PROVIDING BUSINESS GROWTH, FINANCIAL AND SERVICE OPERATION SOFTWARE FOR CHARTS AND BUSINESS MANAGEMENT

(71) Applicant: Timothy Geiger, Collegeville, PA (US)

(72) Inventor: Timothy Geiger, Collegeville, PA (US)

( * ) Notice: Subject to any disclaimer, the term of this patent is extended or adjusted under 35 U.S.C. 154(b) by 635 days.

(21) Appl. No.: 18/096,827

(22) Filed: Jan. 13, 2023

(65) Prior Publication Data

US 2024/0242283 A1      Jul. 18, 2024

(51) Int. Cl.
| | |
|---|---|
| *G06Q 10/0637* | (2023.01) |
| *G06Q 10/0639* | (2023.01) |
| *G06Q 40/06* | (2012.01) |

(52) U.S. Cl.
CPC ......... *G06Q 40/06* (2013.01); *G06Q 10/0637* (2013.01); *G06Q 10/0639* (2013.01)

(58) Field of Classification Search
None
See application file for complete search history.

(56) References Cited

U.S. PATENT DOCUMENTS

| | | | | | |
|---|---|---|---|---|---|
| 8,204,809 | B1 * | 6/2012 | Wise | ................ | G06Q 40/06 705/36 R |
| 10,467,633 | B2 * | 11/2019 | Hsu | .............. | G06Q 30/02 |
| 2002/0173998 | A1 * | 11/2002 | Case | ................ | G06Q 40/03 705/7.33 |
| 2003/0028457 | A1 * | 2/2003 | Costa | ................ | G06Q 40/00 705/26.1 |

| | | | | | |
|---|---|---|---|---|---|
| 2008/0071601 | A1 * | 3/2008 | Cihla | ................ | G06Q 40/00 705/35 |
| 2012/0203598 | A1 * | 8/2012 | Patterson | .......... | G06Q 10/0639 705/7.42 |
| 2014/0324521 | A1 * | 10/2014 | Mun | ................ | G06Q 30/0201 705/7.28 |
| 2023/0004896 | A1 * | 1/2023 | Hartwig | ............ | G06Q 10/0639 |

OTHER PUBLICATIONS

F. Nurprihatin, A. A. N. P. Redi, M. N. Young, W. Septiawan, R. Djajasoepena and S. D. Liman, "Digital Dashboards to Track Performances of Order Management Division Using SCOR and Waterfall Model," 2023 2nd International Conference on Computational Modelling, Simulation and Optimization, Bali, Indonesia(Year: 2023).*

* cited by examiner

*Primary Examiner* — Stephanie Z Delich

(57) ABSTRACT

A system of business growth, financial and service operation for providing charts and business management is disclosed. The system comprises a computing device having a processor and a non-transitory memory unit that stores a set of instructions executable by the processor to provide charts and business management, and one or more databases to store a plurality of financial data and performance data. The computing device is configured to combine the financial data and performance data simultaneously into color-coded charts; convert the data into color coordinated charts; track invoices and chart by sales ticket options with same color coordinated charts; provide live feeds with color-coded data blocks based on hourly pace and progress with views; monitor break-even data and adjust calculations and performance requirements to reach goals and profitability, and gather data and calculations using the marketing section to automate and drive marketing requirements for marketing based on reaching targeted goals.

14 Claims, 7 Drawing Sheets

600

| F14 | | x ✓ fx | 73705 | | | | | | | | | | | | |
|---|---|---|---|---|---|---|---|---|---|---|---|---|---|---|---|
| ⊿ A | B | C | D | E | F | G | H | I | J | K | L | M | | |
| 1 | | | | | | | | | | | | | | | |
| 2 | | | | | | | Performance Summary | | | | | | | | |
| 3 | | | February | 2020 | | | | | | | | | | | |
| 4 | | Date Range | 2/1/2020 | 2/24/2020 | | | | | | | | Reporting Up | 2/24/2020 | |
| 5 | | Days In Month | 29 | | | | | | | | | | | | |
| 6 | | Days Past | 24 | | | | | | | | | Current AR | 0.00 | |
| 7 | | % Of Month Gone | 83% | | | | | | | | | Monthly Goal | 626,762.80 | |
| 8 | | | | | | | | | | | | | | | |
| 9 | | | | | | | | | | | | | | | |
| 10 | | Total Sales | MTD Install | | MTD Service | | MTD Maintenance | | MTD Plumbing | | MTD Company Goal | | | | |
| 11 | | Monthly Goal | 351,202.80 | | 138,000.00 | | 52,560.00 | | 138,000.00 | | 679,762.80 | | | | |
| 12 | | Daily Goal | 12,110.44 | | 4,758.62 | | 1,812.41 | | 4,758.62 | | 23,440.10 | | | | |
| 13 | | Goal For Reporting Date | 290,650.59 | | 114,206.90 | | 43,497.93 | | 114,206.90 | | 562,562.32 | | | | |
| 14 | | Actual Sales | 145.00 | 0.05% | | 0.00% | 21,333.00 | 49.04% | | 0.00% | 21,478.00 | 3.82% | | | |
| 15 | | Difference | (290,505.59) | Behind | (114,206.90) | Behind | (22,164.93) | Behind | ####### | Behind | -541,084.32 | Behind | | | |
| 16 | | Cost Of Sales | | | | | | | | | | | Budget | % |
| 17 | | Equipment | 0.00 | 0.00% | 0.00 | #DIV/0! | 0.00 | 0.00% | 0.00 | #DIV/0! | 0.00 | 0.00% | 117,961.18 | 17.35% |
| 18 | | Material | 1.50 | 1.03% | 0.00 | #DIV/0! | 0.00 | 0.00% | 0.00 | #DIV/0! | 1.50 | 0.01% | 54,395.42 | 8.00% |

Figure 2:
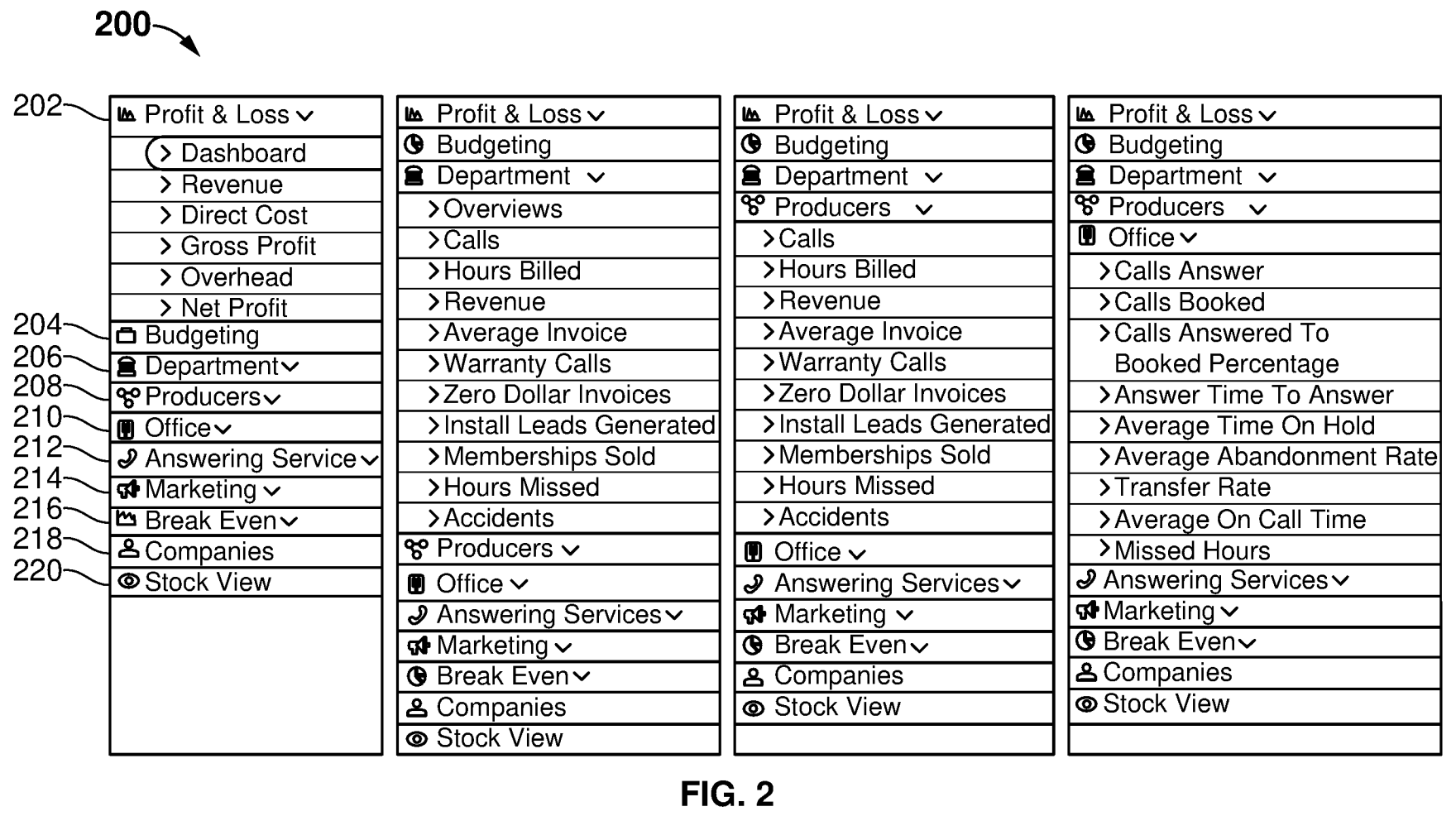

200 →

Panel 1 (202)
- Profit & Loss ⌄ (202)
  - Dashboard
  - Revenue
  - Direct Cost
  - Gross Profit
  - Overhead
  - Net Profit
- Budgeting (204)
- Department ⌄ (206)
- Producers ⌄ (208)
- Office ⌄ (210)
- Answering Service ⌄ (212)
- Marketing ⌄ (214)
- Break Even ⌄ (216)
- Companies (218)
- Stock View (220)

Panel 2
- Profit & Loss ⌄
- Budgeting
- Department ⌄
  - Overviews
  - Calls
  - Hours Billed
  - Revenue
  - Average Invoice
  - Warranty Calls
  - Zero Dollar Invoices
  - Install Leads Generated
  - Memberships Sold
  - Hours Missed
  - Accidents
- Producers ⌄
- Office ⌄
- Answering Services ⌄
- Marketing ⌄
- Break Even ⌄
- Companies
- Stock View

Panel 3
- Profit & Loss ⌄
- Budgeting
- Department ⌄
- Producers ⌄
  - Calls
  - Hours Billed
  - Revenue
  - Average Invoice
  - Warranty Calls
  - Zero Dollar Invoices
  - Install Leads Generated
  - Memberships Sold
  - Hours Missed
  - Accidents
- Office ⌄
- Answering Services ⌄
- Marketing ⌄
- Break Even ⌄
- Companies
- Stock View

Panel 4
- Profit & Loss ⌄
- Budgeting
- Department ⌄
- Producers ⌄
- Office ⌄
  - Calls Answer
  - Calls Booked
  - Calls Answered To Booked Percentage
  - Answer Time To Answer
  - Average Time On Hold
  - Average Abandonment Rate
  - Transfer Rate
  - Average On Call Time
  - Missed Hours
- Answering Services ⌄
- Marketing ⌄
- Break Even ⌄
- Companies
- Stock View

Figure 3:
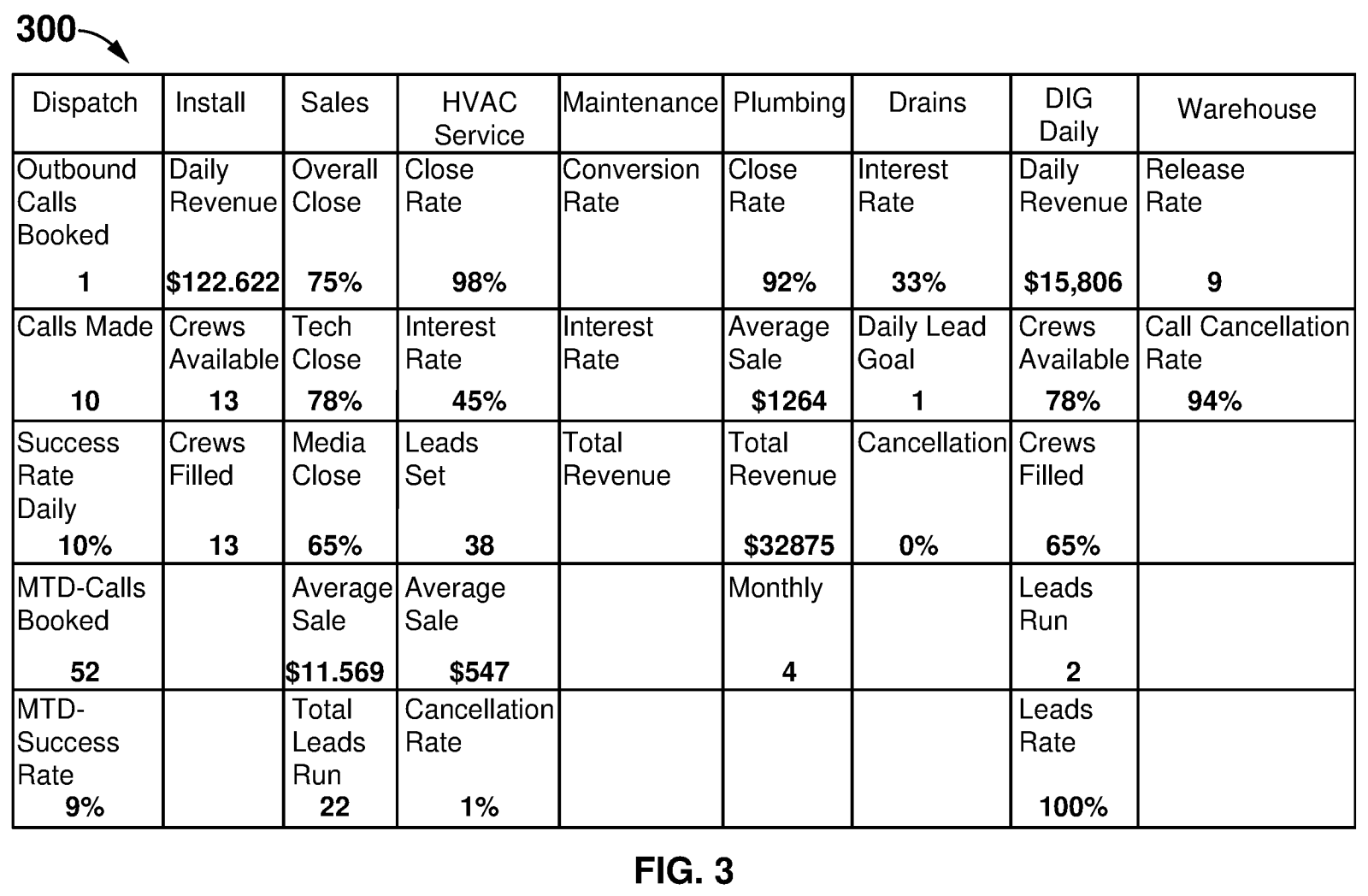

| Dispatch | Install | Sales | HVAC Service | Maintenance | Plumbing | Drains | DIG Daily | Warehouse |
|---|---|---|---|---|---|---|---|---|
| Outbound Calls Booked<br>1 | Daily Revenue<br>$122.622 | Overall Close<br>75% | Close Rate<br>98% | Conversion Rate | Close Rate<br>92% | Interest Rate<br>33% | Daily Revenue<br>$15,806 | Release Rate<br>9 |
| Calls Made<br>10 | Crews Available<br>13 | Tech Close<br>78% | Interest Rate<br>45% | Interest Rate | Average Sale<br>$1264 | Daily Lead Goal<br>1 | Crews Available<br>78% | Call Cancellation Rate<br>94% |
| Success Rate Daily<br>10% | Crews Filled<br>13 | Media Close<br>65% | Leads Set<br>38 | Total Revenue | Total Revenue<br>$32875 | Cancellation<br>0% | Crews Filled<br>65% | |
| MTD-Calls Booked<br>52 | | Average Sale<br>$11.569 | Average Sale<br>$547 | | Monthly<br>4 | | Leads Run<br>2 | |
| MTD-Success Rate<br>9% | | Total Leads Run<br>22 | Cancellation Rate<br>1% | | | | Leads Rate<br>100% | |

Stock View

Time

MTD   3M   6M   YTD   2Y   5Y

Department

5 Selected ▽

| Company | Location | Pace Growth (%) Over Last Year | Pace Avg Invoice | Pace Revenue ($) | Pace Revenue (%) | Pace Overhead Burden | Pace Sold Days (%) | Pace Sales Close Rate | Pace Lead Goal | Pace Labor (%) | Pace Material (%) | Pace Direct Cost (%) | Pace Gross Profit (%) | Pace Overhead (%) | Pace Net Profit (%) |
|---|---|---|---|---|---|---|---|---|---|---|---|---|---|---|---|
| Cardwell HVAC LLC | Cardwell HVAC LLC | 1421% | $2,203.93 | $53556.88 | 70% | 40% | 100% | 45% | 34 | 19% | 19% | 19% | 19% | 19% | 19% |
| Sub Company Cardwell | Cardwell HVAC LLC | 0% | $0.00 | $53556.88 | 70% | 40% | 100% | 45% | 34 | 19% | 19% | 19% | 19% | 19% | 19% |

| J5 | fx | 400 |

| | A | B | C | D | E | F | G | H | I | J | K | L | M | N |
|---|---|---|---|---|---|---|---|---|---|---|---|---|---|---|
| 1 | AD Type | Lead | Sept-Jan | Calls Received | Bkd Service | Bkd Estimates | Referrals | Quotes Given | Bkd Install | Cost Per Service | Cost Per Estimate | Cost Per Install | Income | Return On |
| 2 | Adam Organic | | $4,000 | 2 | 6 | 5 | | 5 | 4 | $246 | $376 | $470 | $44,501 | |
| 3 | LSA (Google Recommends) | | $14,900 | 88 | 56 | 3 | x | 3 | 3 | | | | | |
| 4 | Pay Per Click (Home Local) | 30-40 | $62,017.00 | 611 | 356 | 45 | x | 45 | 38 | | | | | 281% |
| 5 | Clipper | | $33,511.00 | 154 | 31 | 25 | x | 25 | 16 | | | | | |
| 6 | Home Magazine | | ? | 12 | 6 | 4 | x | 4 | 1 | | | | | |
| 7 | Neighbor Saver | | $8,085.00 | 9 | 6 | 1 | x | 1 | 1 | | | | | |
| 8 | Facebook Ads | 20 | ? | 1 | 1 | 0 | x | 0 | 0 | | | | | |
| 9 | Facebook Marketing | | $ - | Manual | 28 | 2 | x | 2 | 2 | | | | | |
| 10 | Shared Contractor Email | | $0 | 26 | 28 | 1 | 23 | 5 | 4 | | | | | |
| 11 | Email Campaigns | | ? | 25 | 11 | 0 | x | 0 | 0 | | | | | |
| 12 | EDOM | | $1,800.00 | 9 | 8 | 0 | x | 0 | 0 | | | | | |
| 13 | Angie's List | | $860.00 | 16 | 7 | 3 | x | 0 | 1 | | | | | |
| 14 | Bus Wrap | | $4,800.00 | 0 | 0 | 0 | x | 0 | 0 | NA | | | | |
| 15 | Bus Shelter | | $1,120.00 | 0 | 0 | 0 | x | 0 | 0 | NA | | | | |
| 16 | BNI | | $738.00 | 26 | 22 | 1 | x | 1 | 0 | | | | | |
| 17 | NBN Postcard | | $350.00 | | | | x | | | | | | | |
| 18 | Sign/Shop/Truck | | | 43 | 20 | 14 | | 14 | 6 | | | | | |
| 19 | Targeted Direct Mail | | $5,000.00 | 10 | 3 | 2 | x | 2 | 0 | | | | | |
| 20 | Andvark | | $9,200.00 | 0 | 0 | 0 | x | 0 | 0 | | | | | |
| 21 | Lower Merion CommNtwk | | $1,100.00 | 16 | 14 | 4 | x | 4 | 0 | | | | | |
| 22 | Google-All (LSA Incld) | | $66,017 | 1179 | 816 | 99 | | 99 | 69 | | | | | |
| 23 | Rheem Website | | $250 | 7 | 2 | 2 | | 2 | 0 | | | | | |
| 24 | Smart Leads | | $1,750 | 0 | 0 | 0 | x | 0 | 0 | | | | | |
| 25 | Total | | $215,4980.00 | 2234 | 1455 | 211 | 23 | 212 | 145 | 5458 | 16151 | | 1569546 | 2.81 |

Figure 6:
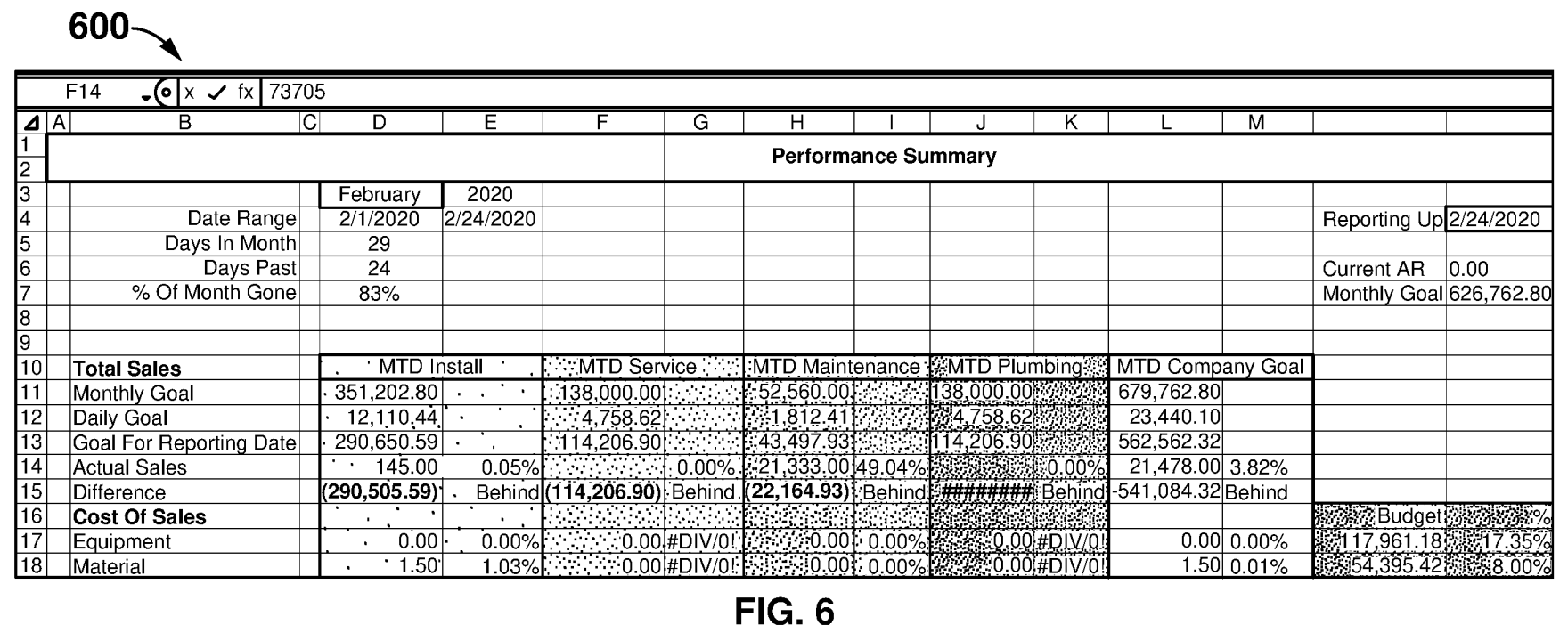

Performance Summary

| | A / B | C | D | E | F | G | H | I | J | K | L | M |
|---|---|---|---|---|---|---|---|---|---|---|---|---|
| 3 | | | February | 2020 | | | | | | | | |
| 4 | Date Range | | 2/1/2020 | 2/24/2020 | | | | | | Reporting Up | 2/24/2020 | |
| 5 | Days In Month | | 29 | | | | | | | | | |
| 6 | Days Past | | 24 | | | | | | | Current AR | 0.00 | |
| 7 | % Of Month Gone | | 83% | | | | | | | Monthly Goal | 626,762.80 | |
| 10 | Total Sales | | MTD Install | | MTD Service | | MTD Maintenance | | MTD Plumbing | | MTD Company Goal | |
| 11 | Monthly Goal | | 351,202.80 | | 138,000.00 | | 52,560.00 | | 138,000.00 | | 679,762.80 | |
| 12 | Daily Goal | | 12,110.44 | | 4,758.62 | | 1,812.41 | | 4,758.62 | | 23,440.10 | |
| 13 | Goal For Reporting Date | | 290,650.59 | | 114,206.90 | | 43,497.93 | | 114,206.90 | | 562,562.32 | |
| 14 | Actual Sales | | 145.00 | 0.05% | 114,206.90 | 0.00% | 21,333.00 | 49.04% | ####### | 0.00% | 21,478.00 | 3.82% |
| 15 | Difference | | (290,505.59) | Behind | (114,206.90) | Behind | (22,164.93) | Behind | ####### | Behind | -541,084.32 | Behind |
| 16 | Cost Of Sales | | | | | | | | | | | |
| 17 | Equipment | | 0.00 | 0.00% | 0.00 | #DIV/0! | 0.00 | 0.00% | 0.00 | #DIV/0! | 0.00 | 0.00% |
| 18 | Material | | 1.50 | 1.03% | 0.00 | #DIV/0! | 0.00 | 0.00% | 0.00 | #DIV/0! | 1.50 | 0.01% |

Budget %
117,961.18 17.35%
54,395.42 8.00%

SYSTEM FOR PROVIDING BUSINESS GROWTH, FINANCIAL AND SERVICE OPERATION SOFTWARE FOR CHARTS AND BUSINESS MANAGEMENT

FIELD OF THE INVENTION

The present invention generally relates to a computerized system for providing business management. More specifically, the present invention relates to a system that combines financial data and performance data simultaneously into color-coded charts for providing business growth, charts, and business management.

BACKGROUND

In recent days, more and more organizations or companies are investing in business management tools to get things done, predict risks, and improve overall efficiency. Thus, business management tools have come a long way and are constantly making things better for anyone involved in some sort of business. The business management tool combines sales and marketing features into a unified platform, giving B2B organizations a single tool to nurture leads throughout their entire funnel.

As companies become increasingly data-driven and monitor more data, charts have become an increasingly valuable tool. The charts are a popular method for sharing information in different settings. The chart combines text, symbols, and/or graphics to describe the relationship between multiple data sets. Most business presentations include at least one chart, and often several. The charts can quickly convey a great deal of information and help viewers remember the data presented, they enable business people to make informed decisions and take action.

However, business owners, managers, and other personnel need a real-time system that can accurately track and manage multiple workers, multiple projects, and the associated documentation requirements, without spending an inordinate amount of time entering data, re-keying data, developing reports, and interfacing with conventional payroll and accounting systems.

In light of the above-mentioned drawback, there is a need for a system that combines financial data and performance data simultaneously into color-coded charts, thereby allowing business professionals to present data in multiple charts at one time. Also, there is a need for a system that gathers data and calculations to automate and drive marketing requirements for marketing based on reaching goals.

SUMMARY OF THE INVENTION

The present invention generally discloses a computerized system for providing business management. Also, the present invention discloses a system that combines financial data and performance data simultaneously into color-coded charts for providing business growth, charts, and business management.

According to the present invention, the system is a computer-implemented system executed in a network environment configured to facilitate business growth, financial and service operations. The system is an innovative and intelligent solution that has been developed to provide charts and business management. In one embodiment, the system is a business growth, financial and service operation software for charts and business management. In one embodiment, the system runs in a computer-implemented network environment or network environment that presents data in color-coded charts and business management.

In one embodiment, the network environment comprises one or more user devices. The user device has an interactive user interface. Each user device is associated with a user. In one embodiment, the user may be, but not limited to, individuals, organizations, companies, various departments, and the like. In one embodiment, the user device is installed with the system. In one embodiment, the system may be an application software or mobile application or web-based application or software application, or desktop application.

In one embodiment, the system further comprises a communication network and a data management system. In one embodiment, the user device is enabled to access the data management system via the network. In one embodiment, the user device enables the user to access one or more services provided by the system. In one embodiment, the user device is at least any one of a smartphone, a mobile phone, a tablet, a laptop, a desktop, and/or other suitable hand-held electronic communication devices. In one embodiment, the user device comprises a storage medium in communication with the network to access the data management system. In an embodiment, the network could be Wi-Fi, WiMAX, wireless local area network (WLAN), satellite networks, cellular networks, private networks, and the like.

In one embodiment, the data management system comprises a computing device and one or more databases in communication with the computing device. In one embodiment, the computing device is a server. In one embodiment, the computing device could be a cloud server. In one embodiment, the server could be operated as a single computer. In some embodiments, the computer could be a touchscreen and/or non-touchscreen and adapted to run on any type of OS, such as iOS™, Windows™, Android™, Unix™, Linux™, and/or others. In one embodiment, the plurality of computers is in communication with each other, via networks. Such communication is established via any one of application software, a mobile application, a browser, an OS, and/or any combination thereof.

In one embodiment, the one or more databases are in communication with the computing device via the network. In another embodiment, the databases are integrated into the computing device or separate from it. In some embodiments, the databases reside in a connected server or a cloud computing service. Regardless of location, the databases comprise a memory to store and organize certain data for use by the computing device. In one embodiment, the database is configured to store a plurality of financial data and performance data.

In one embodiment, the computing device comprises at least one processor and a non-transitory memory unit or computer-readable medium or memory unit coupled to the processor. The memory unit stores a set of instructions executable by the processor configured to provide business growth, financial and service operation, thereby providing color coordinated charts and business management. In one embodiment, the memory unit could be RAM, ROM (including EPROM, EEPROM, PROM).

In one embodiment, the computing device is configured to combine the financial data and performance data simultaneously into color-coded charts. In one embodiment, the color coordinated charts utilize different colors to indicate reaching targeted goals, under achieving goals, and exceeding goals. In one embodiment, the color coordinated charts utilize data intelligence preempting action to reach overhead and sales goals for growth and profits. In one embodiment, the computing device is further configured to convert the data into color coordinated charts; track invoices and chart by sales ticket options with same color coordinated charts. The color coordinated charts are utilized for business budgeting, forecasting, and actual performance for a P&L sheet with dollars and percentages of total business. In one embodiment, the data are viewed in multiple charts at one time. In one embodiment, the system further shows variable moving target goals with the same color theme using progression charts of daily goals. In one embodiment, the progression charts with moving variable targets are viewed by calendar time from daily to many years, for example, 5 years and many years. It also has the ability to view in a rolling time to compare daily, weekly, monthly, to 5 years and more.

In one embodiment, the computing device is further configured to provide live feeds with color-coded data blocks based on hourly pace and progress with views. In one embodiment, the data blocks are color-coded as red or green based on hourly pace and progress with views daily, weekly, monthly and year progress. In one embodiment, the color coordinated charts-based goals are used to find trends and improvement areas to be viewed by company, department, or individual. In one embodiment, the color-coded blocks are live data streams configured to provide a pace view depending on the actual pace of the data being measured. In one embodiment, these blocks are live data streams providing a pace view that are red or green depending on the actual pace of the data being measured. If the data are over the pace, then the amount would be in green color. If the data are under the pace, then the amount would be in red color.

In one embodiment, the computing device is further configured to monitor break-even data and adjust calculations and performance requirements to reach goals and profitability. In one embodiment, the calculations are moving targets and goals for the entire business from marketing, calls, and leads needed to reach goals in the color-coded charts. In one embodiment, the system further includes a marketing channel activity with charted color patterns for data with that same targets and goals, and are adjusted to meet overhead and profit goal. In one embodiment, the computing device is further configured to gather data and calculations using the marketing section to automate and drive marketing requirements for marketing based on reaching targeted goals. The marketing section is configured to perform recording and charting in the same manner as the rest of the software.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

BRIEF DESCRIPTION OF DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and structures disclosed herein. The description of a method step or a structure referenced by a numeral in a drawing is applicable to the description of that method step or structure shown by that same numeral in any subsequent drawing herein.

FIG. 2 shows a screenshot having financial data and all business activity in one embodiment of the present invention.

FIG. 3 shows a chart having break-even data in one embodiment of the present invention.

FIG. 4 shows a screenshot illustrating a stock view of multiple businesses in a color-coded performance in one embodiment of the present invention.

FIG. 5 shows a screenshot illustrating marketing channel activity in one embodiment of the present invention.

FIG. 6 shows a screenshot illustrating performance summary of marketing channel activity in one embodiment of the present invention.

DETAILED DESCRIPTION OF EMBODIMENTS

The present invention is best understood by reference to the detailed figures and description set forth herein.

It is expected that the present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

Figure 1:
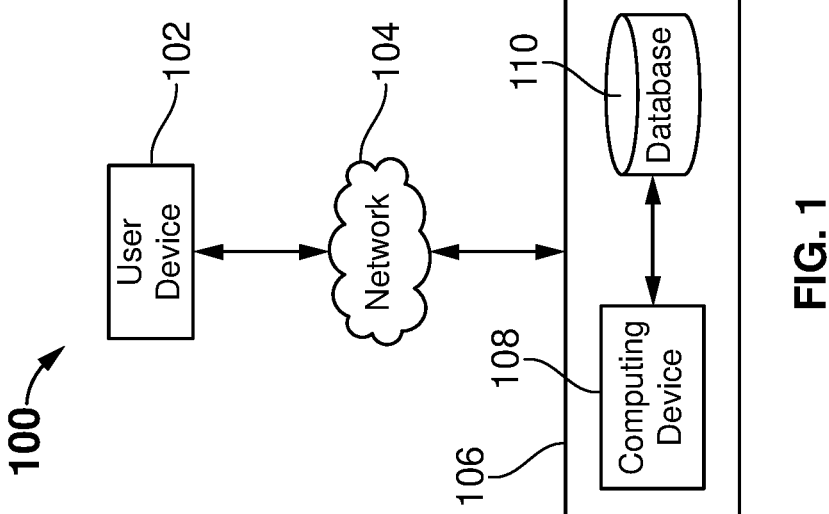
FIG. 1 shows a computer-implemented system executed in a network environment configured to provide business growth in an embodiment of the present invention.

Referring to FIG. 1, a computer-implemented system executed in a network environment 100 configured to facilitate business growth, according to one embodiment of the present invention. The system is an innovative and intelligent solution that has been developed to provide charts and business management. In one embodiment, the system is a business growth, financial and service operation software for charts and business management. The system and its business management process may be carried out with all phases of the business operations, marketing, profit & loss, etc. In one embodiment, the system runs in a computer-implemented network environment or network environment 100 that presents data in color-coded charts and business management.

In one embodiment, the network environment 100 comprises one or more user devices 102. The user device 102 has an interactive user interface. Each user device 102 is associated with a user. In one embodiment, the user may be, but not limited to, individuals, organizations, companies, various departments, and the like. In one embodiment, the user device 102 is installed with the system. In one embodiment, the system may be an application software or mobile application or web-based application or software application, or desktop application.

In one embodiment, the system further comprises a communication network 104 and a data management system 106. In one embodiment, the user device 102 is enabled to access the data management system 106 via the network 104. In one embodiment, the user device 102 enables the user to access one or more services provided by the system. In one embodiment, the user device 102 is at least any one of a smartphone, a mobile phone, a tablet, a laptop, a desktop, and/or other suitable hand-held electronic communication devices. In one embodiment, the user device 102 comprises a storage medium in communication with the network 104 to access the data management system 106. In an embodiment, the network 104 could be Wi-Fi, WiMAX, wireless local area network (WLAN), satellite networks, cellular networks, private networks, and the like.

In one embodiment, the data management system 106 comprises a computing device 108 and one or more databases 110 in communication with the computing device 108. In one embodiment, the computing device 108 is a server. In one embodiment, the computing device 108 could be a cloud server. In one embodiment, the server could be operated as a single computer. In some embodiments, the computer could be a touchscreen and/or non-touchscreen and adapted to run on any type of OS, such as iOS™, Windows™, Android™, Unix™, Linux™, and/or others. In one embodiment, the plurality of computers is in communication with each other, via networks. Such communication is established via any one of application software, a mobile application, a browser, an OS, and/or any combination thereof.

In one embodiment, the one or more databases 110 are in communication with the computing device 108 via the network 104. In one embodiment, the databases 110 are accessible by the computing device 108. In another embodiment, the databases 110 are integrated into the computing device 108 or separate from it. In some embodiments, the databases 110 reside in a connected server or a cloud computing service. Regardless of location, the databases 110 comprise a memory to store and organize certain data for use by the computing device 108. In one embodiment, the database 110 is configured to store a plurality of financial data and performance data.

In one embodiment, the computing device 108 comprises at least one processor and a non-transitory memory unit or computer-readable medium or memory unit coupled to the processor. The memory unit stores a set of instructions executable by the processor configured to provide business growth, financial and service operation, thereby providing color coordinated charts and business management. In one embodiment, the memory unit could be RAM, ROM (including EPROM, EEPROM, PROM).

In one embodiment, the computing device 108 is configured to combine the financial data and performance data simultaneously into color-coded charts. In one embodiment, the color coordinated charts utilize different colors to indicate reaching targeted goals, under achieving goals, and exceeding goals. In one embodiment, the color coordinated charts utilize data intelligence preempting action to reach overhead and sales goals for growth and profits. In one embodiment, the computing device 108 is further configured to convert the data into color coordinated charts; track invoice and chart by sales ticket options with same color coordinated charts. The color coordinated charts are utilized for business budgeting, forecasting and actual performance for a P&L sheet with dollars and percentages of total business. In one embodiment, the data are viewed in multiple charts at one time. In one embodiment, the system further shows variable moving target goals with the same color theme using progression charts of daily goals. In one embodiment, the progression charts with moving variable targets are viewed by calendar time from daily to many years, for example, 5 years and many years. It also has the ability to view in a rolling time to compare daily, weekly, monthly, to 5 years and more.

In one embodiment, the computing device 108 is further configured to provide live feeds with color-coded data blocks based on hourly pace and progress with views. In one embodiment, the color coordinated charts-based goals are used to find trends and improvement areas to be viewed by company, department, or individual. In one embodiment, the color-coded blocks are live data streams configured to provide a pace view depending on the actual pace of the data being measured.

In one embodiment, the computing device 108 is further configured to monitor break-even data and adjust calculations and performance requirements to reach goals and profitability. In one embodiment, the calculations are moving targets and goals for the entire business from marketing, calls, and leads needed to reach goals in the color-coded charts. In one embodiment, the system further includes a marketing channel activity with charted color patterns for data with the same targets and goals, and are adjusted to meet overhead and profit goal. In one embodiment, the computing device 108 is further configured to gather data and calculations using the marketing section to automate and drive marketing requirements for marketing based on reaching targeted goals. The marketing section is configured to perform recording and charting in the same manner as the rest of the software.

Referring to FIG. 2, a screenshot 200 having financial data and all business activities, according to one embodiment of the present invention. The screenshot 200 includes a plurality of options to be performed based on the targeted goals. The screenshot 200 includes a plurality of main categories configured to perform the targeted goals. In one embodiment, the plurality of main categories may include, but not limited to, Profit & Loss 202, Budgeting 204, Department 206, Procedures 208, Office 210, Answering Service 212, Marketing 214, Break Even 216, Companies 218, and Stock View 220.

In one embodiment, the financial data may include, but not limited to, Profit & Loss 202, Department performance 206, Individual performance or Procedures 208, and Office performance 210. In one embodiment, the Profit & Loss 202 may include Dashboard, Revenue, Direct Cost, Gross Profit, Overhead, and Net Profit. In one embodiment, the Dashboard may include a plurality of dashboards for company and departments having live feeds with data blocks. In one embodiment, the data blocks are color-coded as red or green based on hourly pace and progress with views daily, weekly, monthly and year progress. In one embodiment, these blocks are live data streams providing a pace view that are red or green depending on the actual pace of the data being measured. If the data are over the pace, then the amount would be in green color. If the data are under the pace, then the amount would be in red color.

In one embodiment, the Department performance 206 may include Overviews, Calls, Hours Billed, Revenue, Average Invoice, Warranty Calls, Zero Dollar Invoices, Install Leads Generated, Membership Sold, Hours Missed, and Accidents. In one embodiment, the individual or producers' performance 208 may include Calls, Hours Billed, Revenue, Average Invoice, Warranty Calls, Zero Dollar Invoices, Install Leads Generated, Membership Sold, Hours Missed, and Accidents. In one embodiment, the Office performance 210 may include Calla Answer, Calls Booked, Calls Answered to Booked Percentage, Average Time to Answer, Average Time on hold, Average Abandonment rate, Transfer Rate, Average on call Time, and Missed Hours.

In one embodiment, the invoicing is tracked and charted by sales ticket options and charted with the same process and charts as the screenshot 200 based on goals to find trends and areas that need improvements. This can be viewed by company, department or individually.

Referring to FIG. 3, a chart 300 having break-even data, according to one embodiment of the present invention. In one embodiment, the break-even data may include Dispatch, Install, Sales, HVAC Service, Maintenance, Plumbing, Drains, DIG, and Warehouse. In one embodiment, the break-even data are constantly being monitored and calculations are adjusted with overhead, labor costs and sales.

Further, the performance requirements are adjusted on daily basis in order to reach goals and profitability. These calculations are moving targets and goals for the entire business from marketing, calls, and leads needed to reach goals in the color-coded charts. In one embodiment, the marketing section of the system includes marketing channel activity and zip code activity.

Referring to FIG. 4, a screenshot 400 illustrating a stock view of multiple businesses in a color-coded performance, according to one embodiment of the present invention. A company may run multiple businesses with different departments. The system has the capability to provide the multiple business activities of the company in different color-coded format. The screenshot 400 shows the color-coded performance of multiple businesses of a single company. The screenshot 400 includes the company details such as company name, address, and business growth and revenue details. The business growth and revenue details may include pace growth (%) over last year, average pace invoice, pace revenue ($), pace revenue (%), pace overhead burden, pace sold days (%), pace sales close rate, pace lead goal, pace labor (%), pace material (%), pace direct cost (%), pace gross profit (%), pace overhead (%), and pace net profit (%). In one embodiment, the company details are given in different colors, for example, green and red. The performance of the multiple businesses are adjusted to reach the targeted goals as the color-coded performance is goal driven, where the green color indicates good or the over-achieved goals and red color indicates bad or the under goals.

Referring to FIG. 5, a screenshot 500 illustrating marketing channel activity, according to one embodiment of the present invention. The system has the capability to provide reports of their marketing. The reports are not modified as needed hourly, daily, weekly, monthly, or yearly to reach goals and profits and select channels based on return on investment. In one embodiment, the marketing channel activity includes charted color patterns for all the marketing data with the same targets and goals with actual data based on performance. In addition, all targets are adjusted to meet overhead and profit goals on weekly, monthly, YTD, 13-month rolling average, custom date range, and compare range. In one embodiment, an ad campaign is adjusted to meet overhead and profit goals on weekly, monthly, YTD, 13-month rolling average, custom date range, and compare range. In one embodiment, the marketing channel activity may include Marketing Channel or Name, Spend Amount, Calls Received, Booked Service, Booked Estimates, Referrals by Employee, Referrals by Customers, Quotes Given, Booked Install, Cost per Estimate, Cost per Service Customer Acquisition, Cost per Install Customer Acquisition, Income Generated, and Return on Investment.

In one embodiment, the marketing section of the system gathers the data and calculations to automate and drive marketing requirements for more or less marketing based on the reaching goals. In one embodiment, the goals are mentioned in different colors, for example, red and green, in the screenshot 500 to identify their status. The red color indicates bad or the under goals and green color indicates good or the over-achieved goals.

Referring to FIG. 6, a screenshot 600 illustrating performance summary of the marketing channel activity, according to one embodiment of the present invention. In one embodiment, the system further comprises one or more triggers. The triggers include a set of variable performance levels to increase or decrease the marketing channels that provides a better return on investment. In one embodiment, a first trigger is set at a certain percentage to increase the marketing channel budget. In one embodiment, a second trigger is set at a certain percentage to add marketing channel with a budget in dollars. In one embodiment, a third trigger is set at a certain percentage to increase second marketing channel budget. In one embodiment, a fourth trigger is set at a certain percentage to add marketing channel with a budget in dollars. The channels are selected based on marketing that is giving the best ROI from marketing channel activity.

Figure 7:
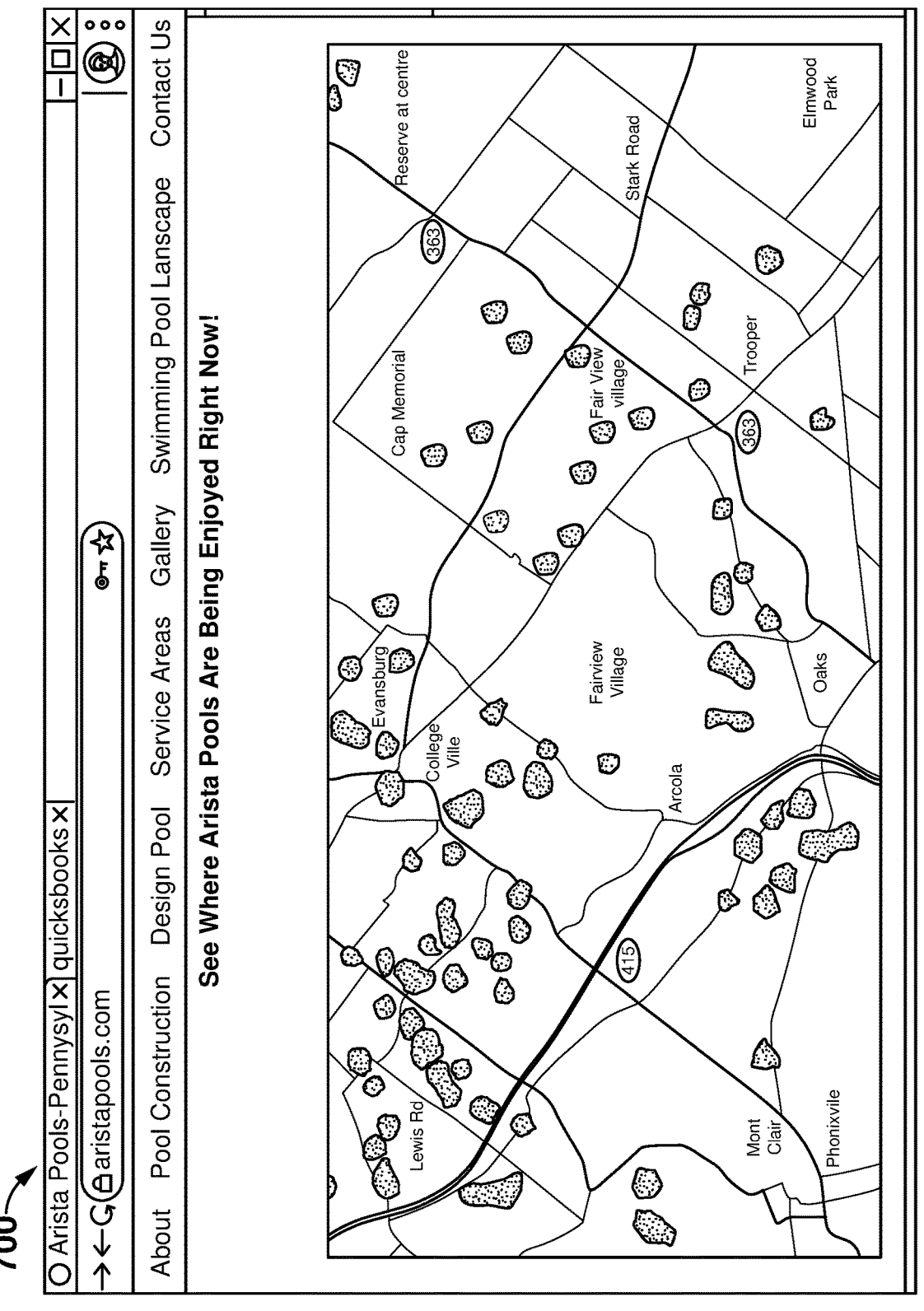
FIG. 7 shows a screenshot illustrating a map of zip code activity in one embodiment of the present invention.

Referring to FIG. 7, a screenshot 700 of a map illustrating a zip code activity, according to one embodiment of the present invention. The map may be a visual heat map. In one embodiment, the system utilizes the visual heat map for underperforming or over performing customer acquisitions in targeted street view or carrier routes as well as zip codes. The zip code activity includes call type for all activities including, but not limited to, installation, service, maintenance, and tune ups. The call type of zip code activity provides customers by zip codes, new customers by zip code within 12 months, and new customers by zip code within 6 months.

In one embodiment, the system comprises one or more steps to guide the organization to make a budget sheet. At one step, a desired growth percentage, for example, 20%, of the company is selected over last year. For example, Table 1 shows last year and growth income auto-fill as follows:

| 2021 | 2022 |
|------|------|
| $1,387,000 | $1,664,400 |

At another step, a percentage of business is selected for each department that totals 100%. For example, the department has 60% of installation and 40% of service. Table 2 shows different department with percentage of business as follows:

| Department | Percentage |
|------------|------------|
| Installation | 60% |
| Service | 40% |

At another step, the monthly percentage of business is collected by each month for each department from local suppliers. This is static for reference and optional for them to fill out. For example, industry monthly volume may include local industry installation and local industry service for at least about 6 months. Table 3 shows monthly percentage of business by each month for each department from local suppliers as follows:

| Month | Local Industry Installation | Local Industry Service |
|---|---|---|
| January | 8 | 8 |
| February | 8 | 8 |
| March | 8 | 8 |
| April | 8 | 8 |
| May | 8 | 8 |
| June | 8 | 8 |

At another step, monthly volume of the company is calculated based on company goals. For example, the company goals may include installation (%) and service (%) for about 12 months that totals 100%. Table 4 shows monthly volume of the company as follows:

| Installation | Percentage | Service | Percentage |
|---|---|---|---|
| January | 8 | January | 8 |
| February | 8 | February | 8 |

-continued

| Installation | Percentage | Service | Percentage |
|---|---|---|---|
| March | 8 | March | 8 |
| April | 8 | April | 8 |
| May | 8 | May | 12 |
| June | 8 | June | 8 |
| July | 8 | July | 8 |
| August | 12 | August | 8 |
| September | 8 | September | 8 |
| October | 8 | October | 8 |
| November | 8 | November | 8 |
| December | 8 | December | 8 |
| Total | 100% | Total | 100% |

At another step, the monthly percentage of direct cost is selected by each month for each department. For example, the direct costs may include installation (%), service (%), and company (%). Further, each department may include Material, Labor, Commissions, Sub-Contractors, Other COGS, Merchant Fees, Refunds, Total Direct Costs, and Gross Profit. In one embodiment, the company is auto-generated based on dollars of total revenue. Further, each department has different revenue. Table 5 shows the monthly percentage of direct costs by each month for each department as follows:

| Installation | Percentage | Service | Percentage | Company | Percentage |
|---|---|---|---|---|---|
| Material | 20 | Material | 8 | Material | 28 |
| Labor | 15 | Labor | 28 | Labor | 43 |
| Commissions | 10 | Commissions | 7 | Commissions | 17 |
| Sub-Contractors | 0 | Sub-Contractors | 0 | Sub-Contractors | 0 |
| Other COGS | 2 | Other COGS | 1 | Other COGS | 3 |
| Merchant Fees | 3 | Merchant Fees | 1 | Merchant Fees | 4 |
| Refunds | 1 | Refunds | 2 | Refunds | 3 |
| Total Direct Costs | 51 | Total Direct Costs | 47 | Total Direct Costs | 98 |
| Gross Profit | 49 | Gross Profit | 53 | Gross Profit | 2 |

At another step, the monthly percentage of overhead cost for company in total is selected. For example, the overhead may include Total Operational Costs, Total Building Related, Total Payroll Related, Total Employee Related, Total Owners Compensation, Total Advertising Related, and Total Vehicle Related. Table 6 shows the monthly percentage of overhead cost for company total as follows:

| Installation | Percentage |
|---|---|
| Total Operational Costs | 10 |
| Total Building Related | 15 |
| Total Payroll Related | 10 |
| Total Employee Related | 0 |
| Total Owners Compensation | 2 |
| Total Advertising Related | 3 |
| Total Vehicle Related | 1 |
| Total Expense | 41 |

Further, Table 7 shows sample data that would be generated by the system. The system may allocate overhead based on percentage of labor for each department and the company as follows.

| Installation | Percentage | Service | Percentage | Company | Percentage |
|---|---|---|---|---|---|
| Total Operational Costs | 20 | Total Operational Costs | 8 | Material | 28 |
| Total Building Related | 15 | Total Building Related | 28 | Labor | 43 |
| Total Payroll Related | 10 | Total Payroll Related | 7 | Commissions | 17 |
| Total Employee Related | 0 | Total Employee Related | 0 | Sub-Contractors | 0 |
| Total Owners Compensation | 2 | Total Owners Compensation | 1 | Other COGS | 3 |
| Total Advertising Related | 3 | Total Advertising Related | 1 | Merchant Fees | 4 |
| Total Vehicle Related | 1 | Total Vehicle Related | 2 | Refunds | 3 |
| Total Expense | 51 | Total Expense | 47 | Total Direct Cost | 98 |

At another step, a net profit is calculated by the system based on the information provided in Table 7. Table 8 shows net profit calculated by the system.

| Installation | Percentage | Service | Percentage | Company | Percentage |
|---|---|---|---|---|---|
| Net Profit | 8 | Net Profit | 12 | Net Profit | 20 |
| Amount | $280,000 | Amount | $360,000 | Amount | $640,000 |

At another step, a budget sheet is prepared based on the above details. In one embodiment, the percentage may need two-digit capability, for example, 7.8. In one embodiment, a few different budget sheets are built at different growth percentages, wherein a best and suitable budget sheet is selected among them. The contractors need a way to make these from any calendar date to finish the year that is in progress. Further, the system may include the line items for mapping section. The line items may include, Totals Sales, Sales—Cash, Cost Of Goods Sold, Equipment, Material, Labor, Training, Commissions, Warranty, Other Cogs, Merchant Fees, Refunds/Client Concerns, Total Direct Cost, Gross Margin, Operating Expenses, Total Operational Costs, Total Building Related, Total Payroll Related, Total Employee Related, Total Owners Compensation, Total Advertising Related, Total Vehicle Related, Total Expense, Other Income & Expenses, Other Income, Other Expense, Total Other Income And Expense, Income (loss) Before Taxes, Income Taxes, And Net Income (loss).

Advantageously, the system of the present invention provides business growth, financial and service operation software for charts and business management. The system combines financial data from business financial software and performance data from service operations software simultaneously or near simultaneously into color-coded charts. The data are viewed in multiple charts at one time, the progressions of daily goals compounding plus's and minus's daily to show variable moving target goals with same color theme wherein the progression charts with moving variable targets can be viewed by calendar time.

Preferred embodiments of this invention are described herein, including the best mode known to the inventors for carrying out the invention. It should be understood that the illustrated embodiments are exemplary only and should not be taken as limiting the scope of the invention.

The foregoing description comprise illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Merely listing or numbering the steps of a method in a certain order does not constitute any limitation on the order of the steps of that method. Many modifications and other embodiments of the invention will come to mind to one skilled in the art to which this invention pertains having the benefit of the teachings in the foregoing descriptions. Although specific terms may be employed herein, they are used only in generic and descriptive sense and not for purposes of limitation. Accordingly, the present invention is not limited to the specific embodiments illustrated herein.

What is claimed is:

1. A computer-implemented system for business growth, financial and service operation, comprising:

a computing device having at least one processor and a non-transitory memory unit coupled to the at least one processor, wherein the non-transitory memory unit stores a set of instructions executable by the processor;

one or more databases in communication with the computing device via a communication network configured to store a plurality of financial data and performance data, and a user device associated with each user in communication with the computing device via the communication network, wherein execution of the instructions by the processor causes the computing device to:

receive in real time the financial data and the performance data from the databases;

generate color coordinated charts by combining the financial data and the performance data;

dynamically update the color coordinated charts by automatically adjusting calculations associated with break-even data, thereby recalculating break-even thresholds in response to received financial and performance data, and propagating corresponding color changes across multiple linked charts in real time;

provide on the user device a live feed interface comprising color-coded data blocks that dynamically update on an hourly basis to indicate pace and progress relative to the recalculated break-even thresholds; and automatically generate and modify marketing requirements based on the automatically adjusted calculations and the color coordinated charts without user intervention.

2. The system of claim 1, wherein the color coordinated charts utilize different colors to indicate reaching targeted goals, under achieving goals, and exceeding goals.

3. The system of claim 1, wherein the color coordinated charts utilize data intelligence preempting action to reach overhead and sales goals for growth and profits.

4. The system of claim 1, wherein the color coordinated charts are utilized for business budgeting, forecasting and actual performance for a P&L sheet with dollars and percentages of total business.

5. The system of claim 1, wherein the financial data and performance data are viewed in multiple color coordinated charts at one time.

6. The system of claim 1, further shows variable moving target goals with the same color theme using progression charts of daily goals.

7. The system of claim 6, wherein the progression charts with moving variable targets are viewed by calendar time from daily to many years.

8. The system of claim 1, wherein the color coordinated charts are used to find trends and improvement areas to be viewed by company, department, or individual.

9. The system of claim 1, wherein the color-coded data blocks are live data streams configured to provide a pace view depending on the actual pace of the financial data and performance data being measured.

10. The system of claim 1, wherein the calculations are moving targets and goals for a business from marketing, calls, and leads needed to reach goals in the color coordinated charts.

11. The system of claim 1, a marketing channel activity with charted color patterns for data with same targets and goals are adjusted to meet overhead and profit goals.

12. The system of claim 1, further comprises one or more triggers including a set of variable performance levels to increase or decrease marketing channels that provides a return on investment.

13. The system of claim 12, wherein the triggers are set in percentage value according to increase in marketing channel budget, and add marketing channel budget.

14. The system of claim 1, wherein the color coordinated charts are provided with a marketing channel, spend amount, calls received, booked service, booked estimates, referrals by employee, referrals by customers, quotes given, booked install, cost per estimate, cost per service customer acquisition, cost per install customer acquisition, income generated and return on investment.

* * * * *